(12) United States Patent
Chang et al.

(10) Patent No.: US 7,746,341 B2
(45) Date of Patent: Jun. 29, 2010

(54) SYSTEM AND METHOD FOR PARSING POINT-CLOUD DATA

(75) Inventors: Chih-Kuang Chang, Taipei Hsien (TW); Xin-Yuan Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 765 days.

(21) Appl. No.: 11/614,997

(22) Filed: Dec. 22, 2006

(65) Prior Publication Data

US 2007/0257908 A1 Nov. 8, 2007

(30) Foreign Application Priority Data

May 5, 2006 (CN) .................... 2006 1 0035423

(51) Int. Cl.
*G06T 15/00* (2006.01)
(52) U.S. Cl. .................. 345/420; 452/157; 452/198; 382/110; 382/312
(58) Field of Classification Search ............ 345/420; 715/324, 762, 763; 452/157, 198; 382/110, 382/312
See application file for complete search history.

(56) References Cited

U.S. PATENT DOCUMENTS

| 6,738,727 | B2 | 5/2004 | Chang |
| 6,847,462 | B1 | 1/2005 | Kacyra et al. |
| 6,862,601 | B2 | 3/2005 | Doney et al. |
| 6,968,299 | B1 | 11/2005 | Bernardini et al. |
| 7,225,396 | B2 * | 5/2007 | Chen et al. ................. 715/234 |

FOREIGN PATENT DOCUMENTS

| CN | 100363932 C | 1/2008 |
| CN | 200410029426 | 3/2008 |

* cited by examiner

*Primary Examiner*—Phu Nguyen
(74) *Attorney, Agent, or Firm*—Wei Te Chung

(57) ABSTRACT

A method for parsing point-cloud data is provided. The method includes the steps of: (a) receiving a point-cloud file from a database; (b) determining whether the point-cloud file is in a first format or a second format; (c) opening the point-cloud file in a binary data mode and transforming the binary data to predetermined readable data to be stored as a temporary file, and setting the temporary file as a target point-cloud file if the point-cloud file is in the second format, otherwise, if the point-cloud file is in the first format, setting the first format point-cloud file as the target point-cloud file; and (d) parsing point-cloud data in the target point-cloud file into a predetermined data structure. A related system is also provided.

10 Claims, 4 Drawing Sheets

SYSTEM AND METHOD FOR PARSING POINT-CLOUD DATA

BACKGROUND OF THE INVENTION

1. Field of the Invention

The present invention generally relates to measuring systems and methods, and more particularly, to a system and method for parsing point-cloud data.

2. Description of Related Art

A point-cloud, often created by scanning a surface of a workpiece utilizing a three-dimensional (3D) scanner, is a set of 3D points describing the outlines or surface features of the object. In most situations, multiple scans, or even hundreds of scans, from different directions are usually required to obtain information about all surfaces of the object. If color information is scanned at each point, the colors on the surface of the workpiece can also be obtained. Then, the point-clouds of the workpiece are transferred to a computer for further processing by a point-cloud measuring software, such as computer aided design (CAD) or computer aided manufacture (CAM), so as to create a complete digital, 3D model of the workpiece that can be used in a wide variety of applications.

At present, various formats of the point-cloud file exists due to different kinds of 3D scanners available. However, a point-cloud measuring software can only read point-clouds files in a defined file format, for example, most of the point-cloud measuring software can not read Metris basic file (MBF) format point-cloud data produced by a particular type of scanner that is produced by the Metris Corporation, Belgium.

What is needed, therefore, is a system and method for parsing point-cloud data in a predetermined format, creating an integrated model for point-clouds of an object, thus facilitating engineers to detect the features of the object.

SUMMARY OF THE INVENTION

A system for parsing point-cloud data in accordance with a preferred embodiment is provided. The system includes an application server. The application server includes: a point-cloud file receiving module, for receiving a point-cloud file from a database; a file format detecting module, for detecting whether the point-cloud file is in a text format; a data format transforming module, for opening the point-cloud file in a binary data mode and transforming the binary data to predetermined readable data to be stored as a temporary file, if the point-cloud file is in a non-text format; a parameter setting module for setting either of the text format point-cloud file and the temporary file as a target point-cloud file; a data structure applying module, for applying a predetermined data structure to store parsed data values of the point-clouds; a point-cloud information record module, for allocating memory for point-cloud information records of the data structure, and further allocating the memory for items in each point-cloud information record to store data values of each point-cloud; and a point-cloud data parsing module, for parsing data from the target file into the point-cloud information records of the data structure.

Another preferred embodiment provides a method for parsing point-cloud data. The method includes the steps of: (a) receiving a point-cloud file from a database; (b) determining whether the point-cloud file is in a first format or a second format; (c) opening the point-cloud file in a binary data mode and transforming the binary data to predetermined readable data to be stored as a temporary file, and setting the temporary file as a target point-cloud file if the point-cloud file is in the second format, otherwise, if the point-cloud file is in the first format, setting the first format point-cloud file as the target point-cloud file; and (d) parsing point-cloud data in the target point-cloud file into a predetermined data structure.

Other objects, advantages and novel features of the present invention will be drawn from the following detailed description of the preferred embodiment and preferred method of the present invention with the attached drawings.

DETAILED DESCRIPTION OF THE PREFERRED EMBODIMENT

Figure 1:
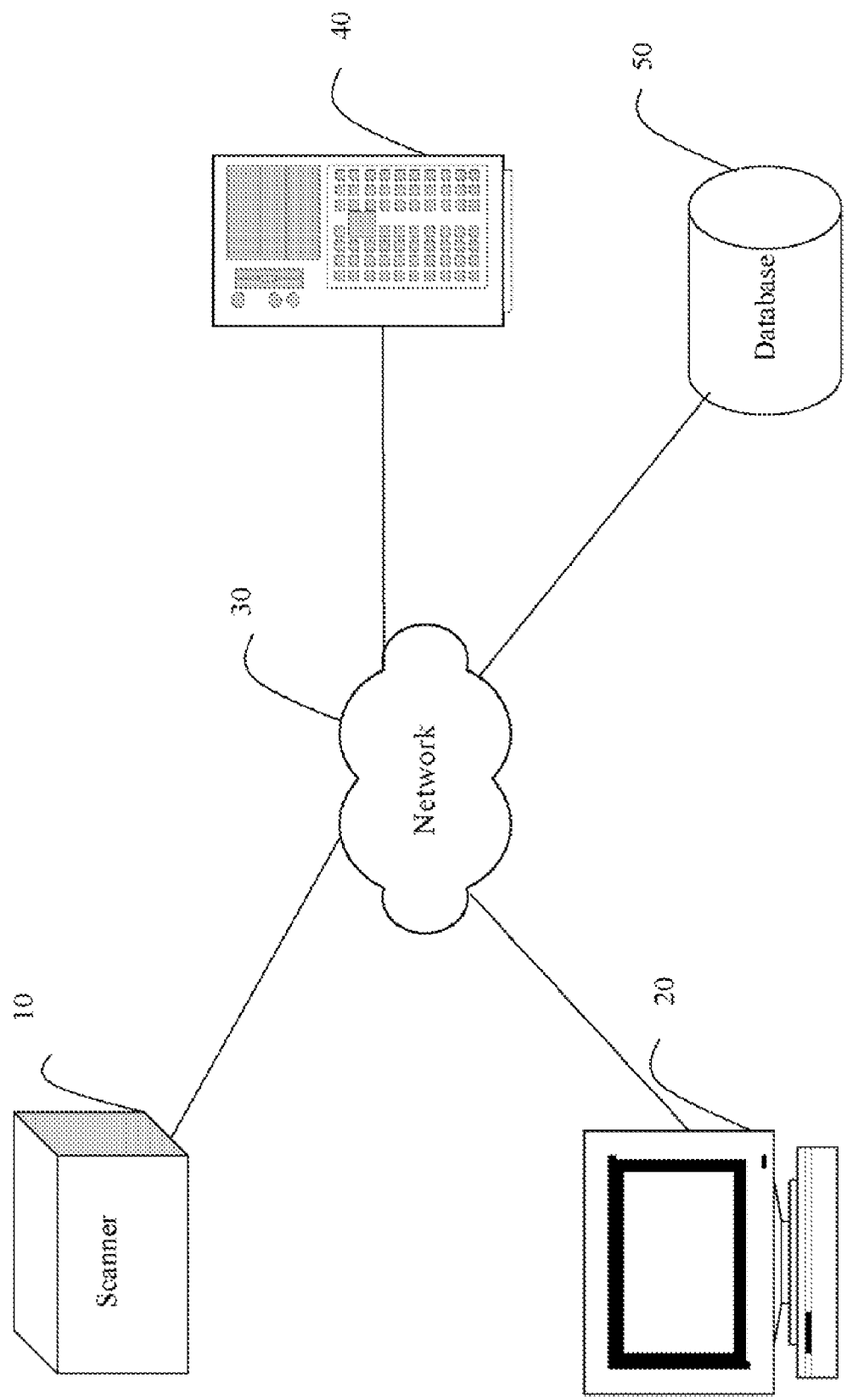
FIG. 1 is a schematic diagram illustrating a system for parsing point-cloud data according to a preferred embodiment.

FIG. 1 is a schematic diagram illustrating a system for analyzing point-cloud data according to a preferred embodiment. The system mainly includes a scanner 10, a network 30, an application server 40, a database 50, and a plurality of client computer 20 (only one shown). The scanner 10 scans at least one surface of a workpiece to obtain at least one point-cloud of the workpiece. The database 50 is for saving data values of the point-clouds of the workpiece in a point-cloud file. The application server 40 includes a plurality of function modules for parsing data values of the point-clouds from the point-cloud file, and for storing parsed data values of the point-clouds in a predetermined data structure. The client computers 20 are provided for users to invoke the function modules in the application server 40 via the network 30. The network 30 can be an intranet, or the Internet, or any other kind of network.

Figure 2:
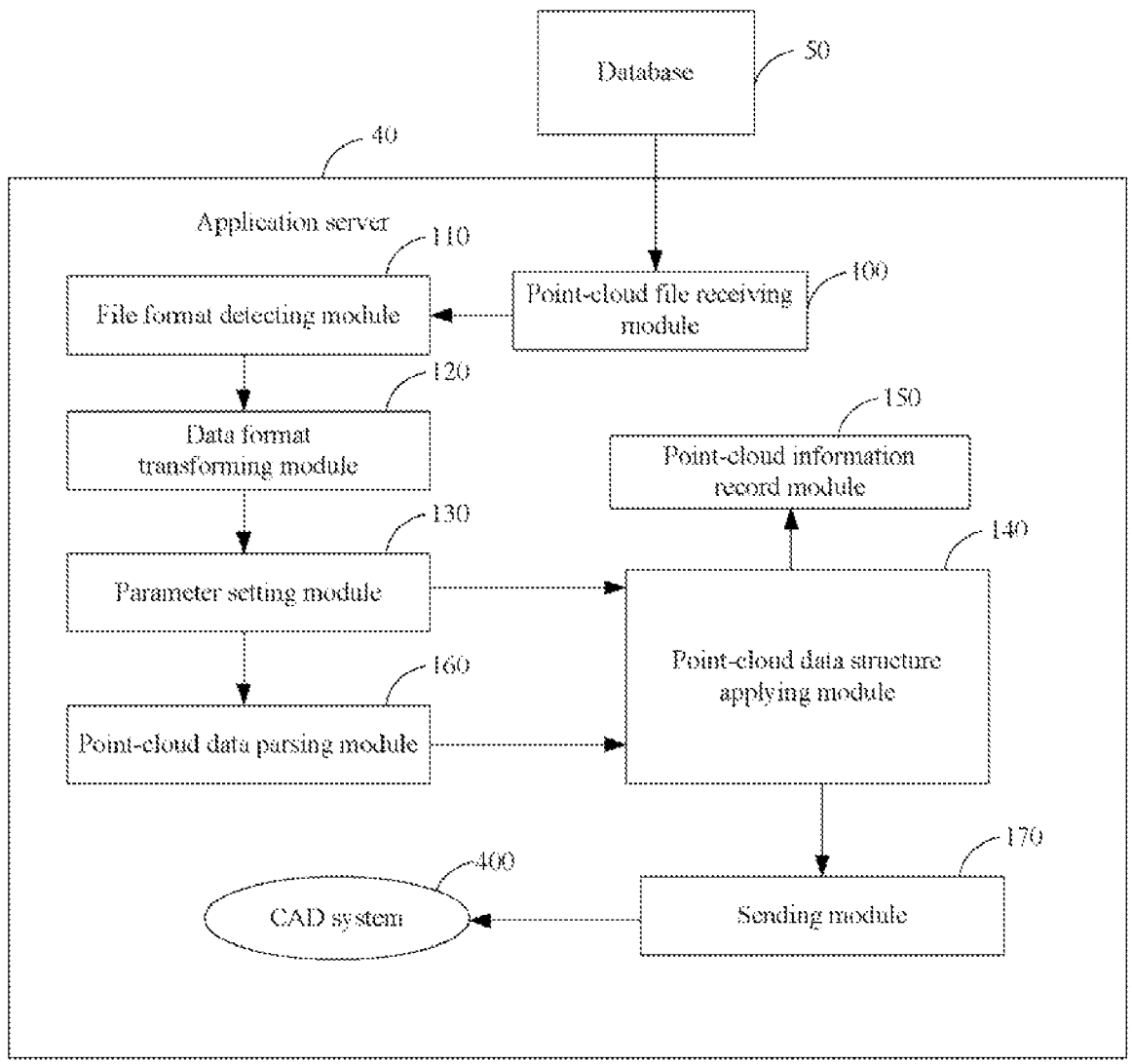
FIG. 2 is a block diagram illustrating main function modules of an application server in FIG. 1.

FIG. 2 is a block diagram illustrating main function modules of the application server 40. The application server 40 mainly includes: a point-cloud file receiving module 100, a file format detecting module 110, a data format transforming module 120, a parameter setting module 130, a data structure applying module 140, a point-cloud information record module 150, a point-cloud data parsing module 160 (hereinafter, "the data parsing module 160"), and a sending module 170.

The point-cloud file receiving module 100 is used for receiving a point-cloud file from the database 50.

The file format detecting module 110 is used for detecting a format of the point-cloud file. The point-cloud file may be in a recognizable format such as a text format (e.g. American standard code for information interchange (ASCII) format) or an unrecognizable format such as a non-text format (e.g. MBF format).

The data format transforming module 120 is used for opening the point-cloud file in a binary data mode and transforming the binary data to predetermined readable data to be stored as a temporary file, if the point-cloud file is in a non-text format.

The parameter setting module 130 is used for setting either of the text format point-cloud file and the temporary file as a target point-cloud file.

The data structure applying module 140 is used for applying a predetermined data structure to store parsed data values of the point-clouds. The data structure contains point-cloud information records where each of the records is used for storing data values of each of the point-clouds.

The data values of each point-cloud typically include: Point-cloud ID, attributes of the point-cloud, and 3d coordinate values of each points in the point-cloud. The attributes of the point-cloud mainly include: a color (or colors) of the point-cloud, a brightness value of the point-cloud, a layer value that describes where the point-cloud is located corresponding the work piece, a value of a total number of points in the point-cloud, and three-dimensional (3D) coordinate values of edge points of the point-cloud.

The point-cloud information record module 150 is used for allocating memory for the point-cloud information records to store the data values of the point-clouds. Memory is further allocated for items in each point-cloud information record to store data values of each point-cloud. The point-cloud record consists of items such as an ID item, a point information item, and items of point-cloud attributes to store data values such as the Point-cloud ID, the 3d coordinate values of each points in the point-cloud and the attributes of the point-cloud respectively. The point-cloud information record module 150 is further used for storing parsed data values of the point-clouds into the point-cloud information records.

The data parsing module 160 is used for parsing data from the target file (the text format point-cloud file or the transformed point-cloud file).

The sending module 170 is used for sending the data structure to a CAD system 400 to generate a model of the point-clouds. The CAD system 400 can be an AutoCAD application, a Pro/E application, a 3D Max application, or any other kind of computer aided design application.

Figure 3:
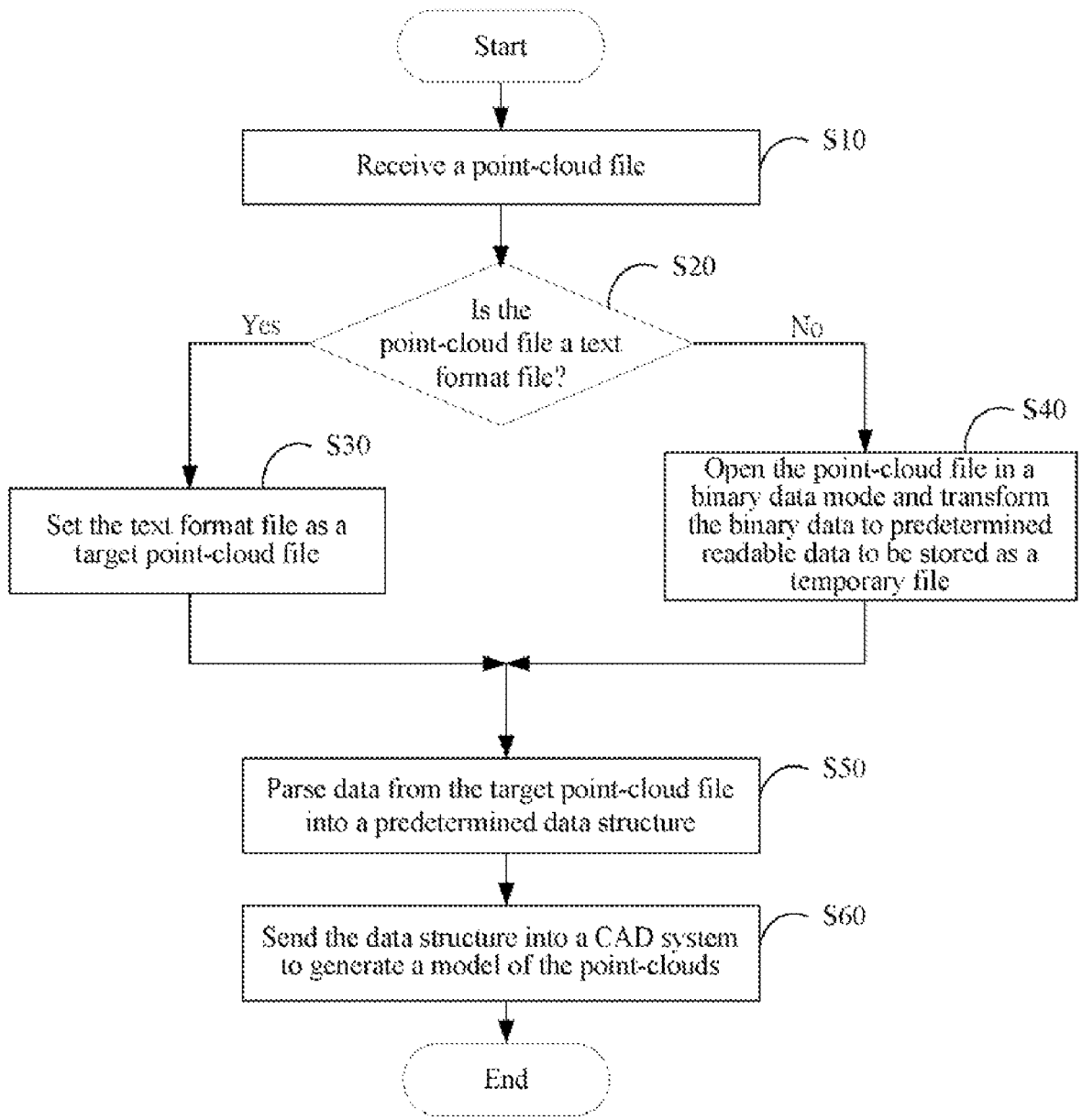
FIG. 3 is a flowchart of a preferred method for parsing point-cloud data.

FIG. 3 is a flowchart of a preferred method for parsing point-cloud data in the point-cloud file. In step S10, the point-cloud file receiving module 100 receives a point-cloud file.

In step S20, the file format detecting module 110 detects a file format of the point-cloud file. In this embodiment, the file format may be text or non-text.

If the point-cloud file is in the text format, in step S30, the parameter setting module 130 sets the text format file as a target point-cloud file, and the procedure goes to step S50.

Otherwise, if the point-cloud file is in the non-text format, in step S40, the data format transforming module 120 opens the point-cloud file in a binary data mode, transforms the binary data to a predetermined readable data to be stored as a temporary file, and signals the parameter setting module 130 to set the temporary file as the target point-cloud file.

Figure 4:
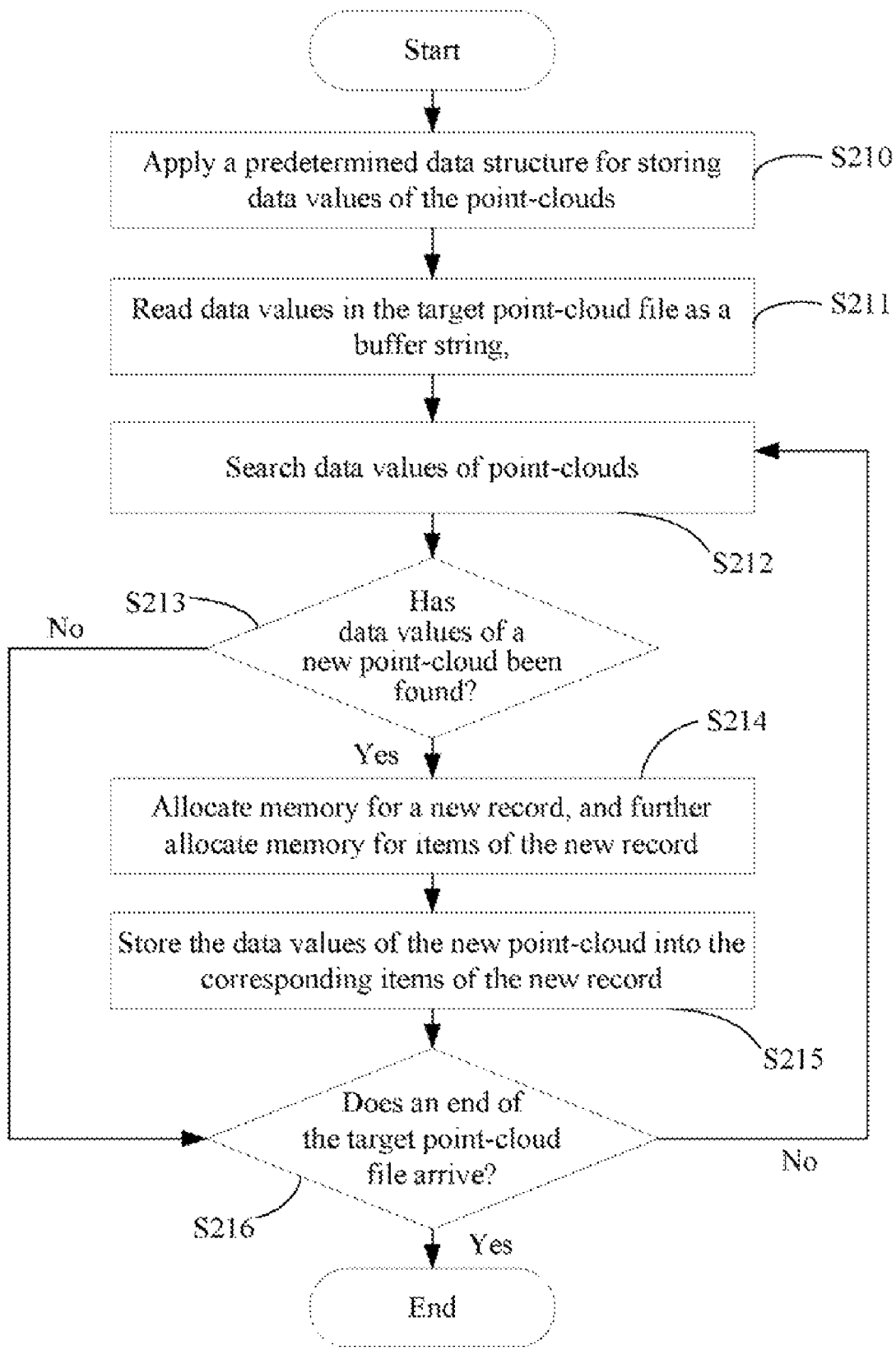
FIG. 4 is a detailed description of one step in FIG. 3, namely parsing data in the target point-cloud file into a predetermined data structure.

In step S50, the data parsing module 160 parses data from the target point-cloud file into a predetermined data structure (detailed description is given in FIG. 4).

In step S60, the sending module 170 sends the data structure into a CAD system 400 to generate a model of the point-clouds. The CAD system 400 can be an AutoCAD application, a Pro/E application, a 3D Max application, or any other kind of computer aided design application.

FIG. 4 is a detailed description of step S50 in FIG. 3. In step S210, the data structure applying module 140 applies a predetermined data structure for storing data values of the point-clouds. The point-cloud data structure contains records that store data values of each of the point-clouds.

In step S211, the data parsing module 160 reads point-cloud data values in the target point-cloud file as a buffer string.

In step S212, the data parsing module 160 searches data values of point-clouds in the buffer string.

In step S213, the data parsing module 160 detects whether data values of a new point-cloud has been found, such as character strings "New scan (1)", "New scan (2)", "Camera 1", or a decimal number "300" specifying the total number of points in the point-cloud, or a character string "Start Point" marking a starting point and a character string "End Point" marking an end point, or any other similar kind of data.

If no data values of a new point-cloud has been found, the procedure goes to step S216 described below.

Otherwise, if data values of the new point-cloud identification information has been searched, In step S214, the point-cloud information record module 150 allocates memory for a new point-cloud information record of the data structure, and further allocates the memory for items in the new point-cloud information record to store data values of the new point-cloud.

In step S215, the point-cloud information record module 150 stores the data values into the corresponding items of the new point-cloud information record. The items of the new point-cloud information record may include: Point-cloud ID, Layer, Color, Light, Min Point, Max Point, points of the new point-cloud and the xyz coordinates values of the points of the new point-cloud, etc. For example, the point-cloud information record module 150 stores an ID value (e.g. "New scan (1)") of the new point-cloud into a point-cloud ID item of the new point-cloud information record, stores the xyz coordinate values of each points in the new point-cloud into a point information item of the new point-cloud information record, and stores attribute values such as Layer, Color, Light of the new point-cloud into corresponding attribute items of the new point-cloud information record.

In step S216, the data parsing module 160 detects whether an end of the target point-cloud file is detected, if the end of the target point-cloud file is detected, the procedure ends; otherwise, the procedure repeats from step S212.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for parsing point-cloud data comprising an application server, the application server comprising:
   a point-cloud file receiving module, for receiving a point-cloud file from a database;
   a file format detecting module, for detecting whether the point-cloud file is in a text format;
   a data format transforming module, for opening the point-cloud file in a binary data mode and transforming the binary data to predetermined readable data to be stored as a temporary file, if the point-cloud file is in a non-text format;
   a parameter setting module for setting either of the text format point-cloud file and the temporary file as a target point-cloud file;
   a data structure applying module, for applying a predetermined data structure to store point-cloud information records, which comprise parsed data values of the point-clouds;
   a point-cloud information record module, for allocating memory for the point-cloud information records of the data structure, and allocating the memory for items in each point-cloud information record to store data values of each point-cloud; and
   a point-cloud data parsing module, for parsing data from the target file into the point-cloud information records of the data structure.

2. The system as claimed in claim 1, wherein the application server further comprises a sending module for sending the data structure to a computer aided system to generate a model of the point-clouds.

3. The system as claimed in claim 1, wherein the point-cloud information record module is further used for storing parsed data values of the point-clouds into the point-cloud information records.

4. The system as claimed in claim 1, wherein the data values of each point-cloud comprise an identification of the point-cloud, attributes of the point-cloud, and three-dimensional coordinate values of each point in the point-cloud.

5. The system as claimed in claim 4, wherein the attributes of the point-cloud comprise a color of the point-cloud, a brightness value of the point-cloud, a layer value that describes where the point-cloud is located in a workpiece, a total number of points in the point-cloud, and three-dimensional coordinate values of edge points in the point-cloud.

6. A computer-based method for analyzing point-cloud data by a computer system, comprising the steps of:
   receiving a point-cloud file from a database;
   determining whether the point-cloud file is in a first format or a second format;
   opening the point-cloud file in a binary data mode and transforming the binary data to predetermined readable data to be stored as a temporary file, and setting the temporary file as a target point-cloud file if the point-cloud file is configured in the second format, otherwise, if the point-cloud file is configured in the first format, setting the first format point-cloud file as the target point-cloud file; and
   parsing point-cloud data in the target point-cloud file into a predetermined data structure.

7. The method as claimed in claim 6, further comprising the step of:
   sending the data structure to a computer aided system to generate a model of the point-clouds.

8. The method as claimed in claim 6, wherein the first format is a text format.

9. The method as claimed in claim 6, wherein the second format is a non-text format.

10. The method as claimed in claim 6, wherein the parsing step comprises the steps of:
   applying a predetermined data structure for storing data values of the point-clouds;
   reading data values in the target point-cloud file as a buffer string;
   searching data values of point-clouds in the buffer string;
   detecting whether data values of a new point-cloud have been found;
   allocating memory for a new point-cloud information record of the data structure, and further allocating the memory for items in the new point-cloud information record to store data values of the new point-cloud, if data values of a new point-cloud have been found;
   storing the data values of the new point-cloud into the corresponding items of the new point-cloud information record;
   detecting whether an end of the target point-cloud file arrives; and
   repeating from the searching step, if not yet detected the end of the point-cloud file.

\* \* \* \* \*